United States Patent [19]

Frank

[11] Patent Number: 5,255,953
[45] Date of Patent: Oct. 26, 1993

[54] IMPACT GIRDER FOR VEHICLE DOORS

[75] Inventor: Simon Frank, Watterdingen, Fed. Rep. of Germany

[73] Assignee: Alusuisse-Lonza Services Ltd., Zurich, Switzerland

[21] Appl. No.: 923,250

[22] Filed: Jul. 31, 1992

[30] Foreign Application Priority Data

Aug. 12, 1991 [CH] Switzerland ............ 2376/91

[51] Int. Cl.$^5$ .............................................. B60J 5/04
[52] U.S. Cl. .................... 296/146.6; 296/188; 296/209; 49/52
[58] Field of Search ............ 296/146 C, 188, 189, 296/209; 49/502

[56] References Cited

U.S. PATENT DOCUMENTS

| 3,718,364 | 2/1973 | Fischer | 296/146 C X |
|---|---|---|---|
| 3,964,208 | 6/1976 | Renner et al. | 49/502 |
| 4,306,381 | 12/1981 | Presto | 49/502 |
| 4,786,100 | 11/1988 | Kleemann et al. | 296/146 C |
| 4,838,606 | 6/1989 | Furubayashi et al. | 296/146 C X |
| 4,969,680 | 11/1990 | Shimoda | 296/146 C |

FOREIGN PATENT DOCUMENTS

| 0063325 | 10/1982 | European Pat. Off. . | |
| 0244579 | 11/1987 | European Pat. Off. . | |
| 0330759 | 9/1989 | European Pat. Off. | 296/188 |
| 2328829 | 1/1975 | Fed. Rep. of Germany | 49/502 |
| 3606024 | 8/1987 | Fed. Rep. of Germany | 296/188 |
| 3709489 | 7/1988 | Fed. Rep. of Germany . | |
| 0114072 | 4/1990 | Japan | 296/209 |
| 1156929 | 5/1985 | U.S.S.R. | 296/188 |
| 1197876 | 12/1985 | U.S.S.R. | 296/188 |
| 2152883 | 8/1985 | United Kingdom . | |

Primary Examiner—Dennis H. Pedder
Attorney, Agent, or Firm—Bachman & LaPointe

[57] ABSTRACT

The impact girder extruded in a light metal alloy and extending in the vehicle door approximately in the direction of travel can be fixed at both ends in such a way that a profile wall of the impact girder faces towards the inside of the vehicle as the inner flange and a second profile wall of the impact girder provided at a distance from the first forms an outer flange. Fastened to the impact girder is a hollow chamber profile, similarly extruded from a light metal alloy, with at least two profile chambers, the hollow chamber profile protruding into the door box below the impact girder and the profile chambers extending parallel to the latter. The hollow chamber profile provides additional impact protection.

6 Claims, 3 Drawing Sheets

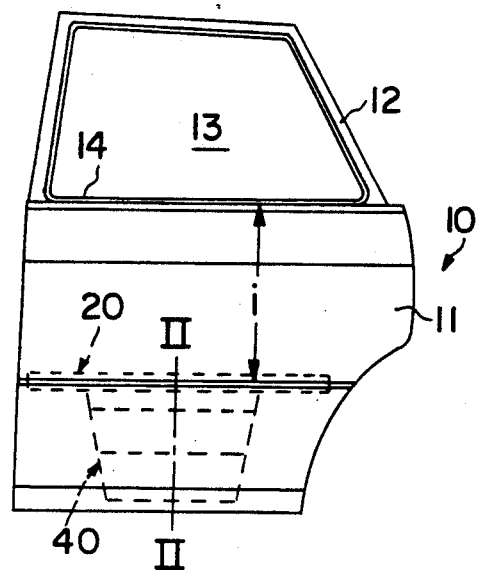
FIG.1
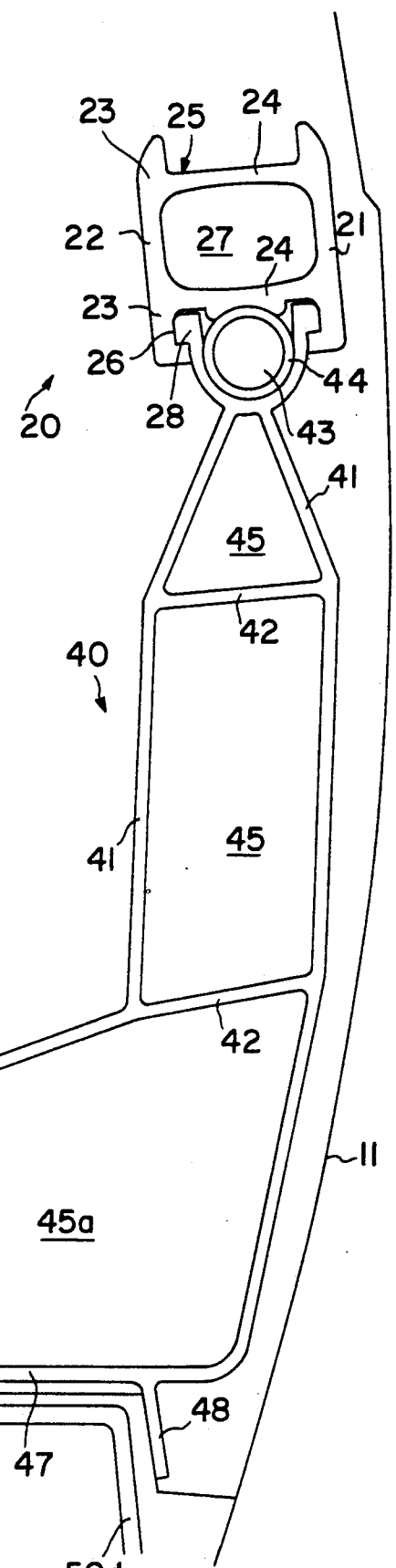
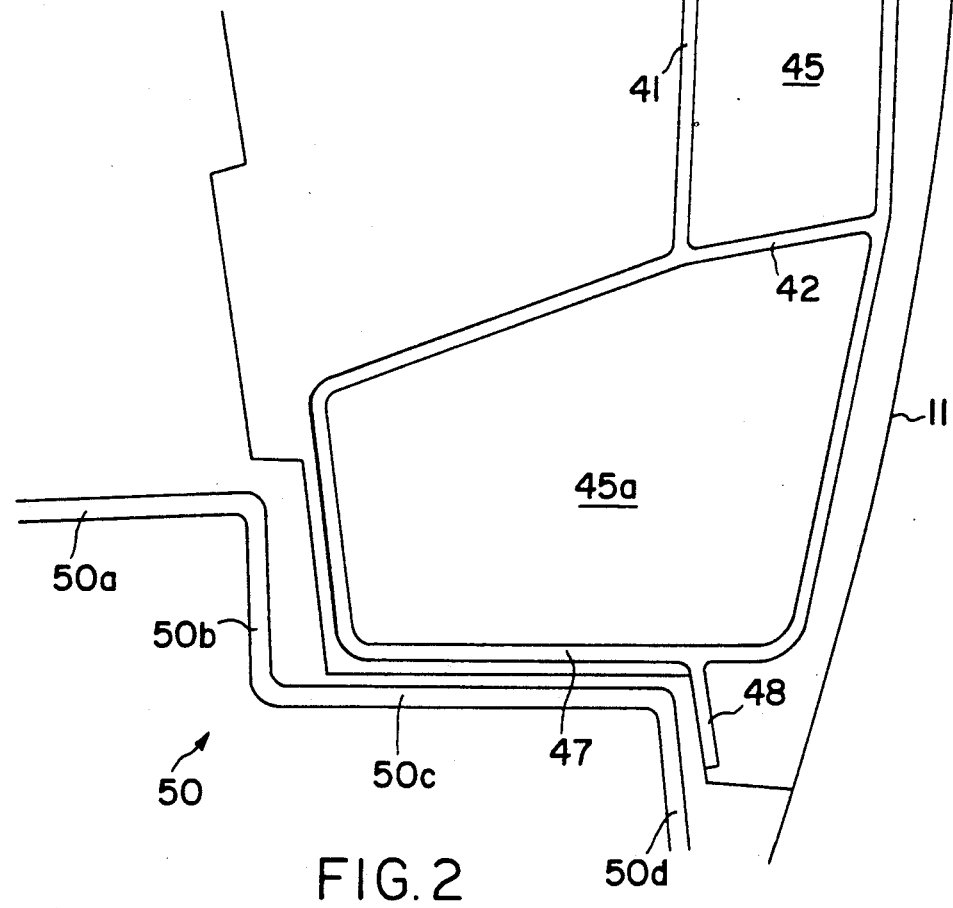
FIG.2

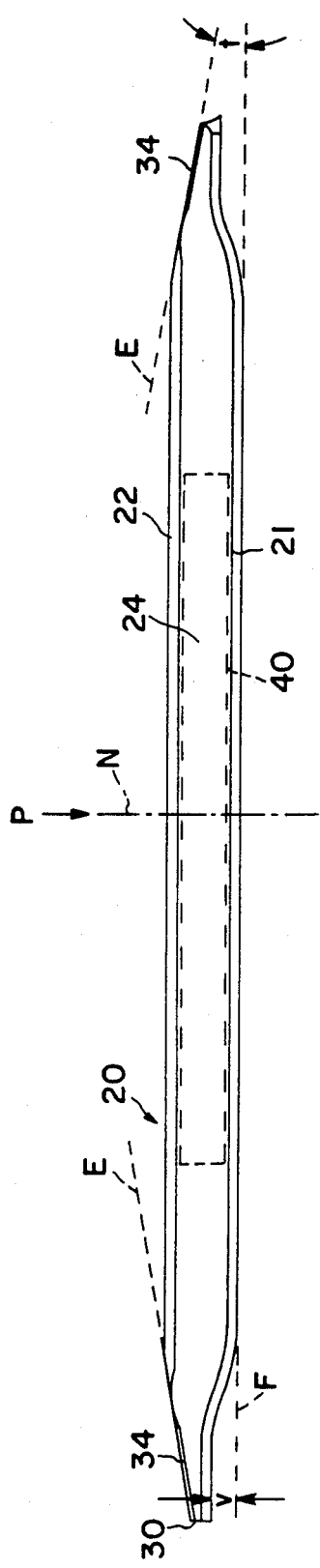
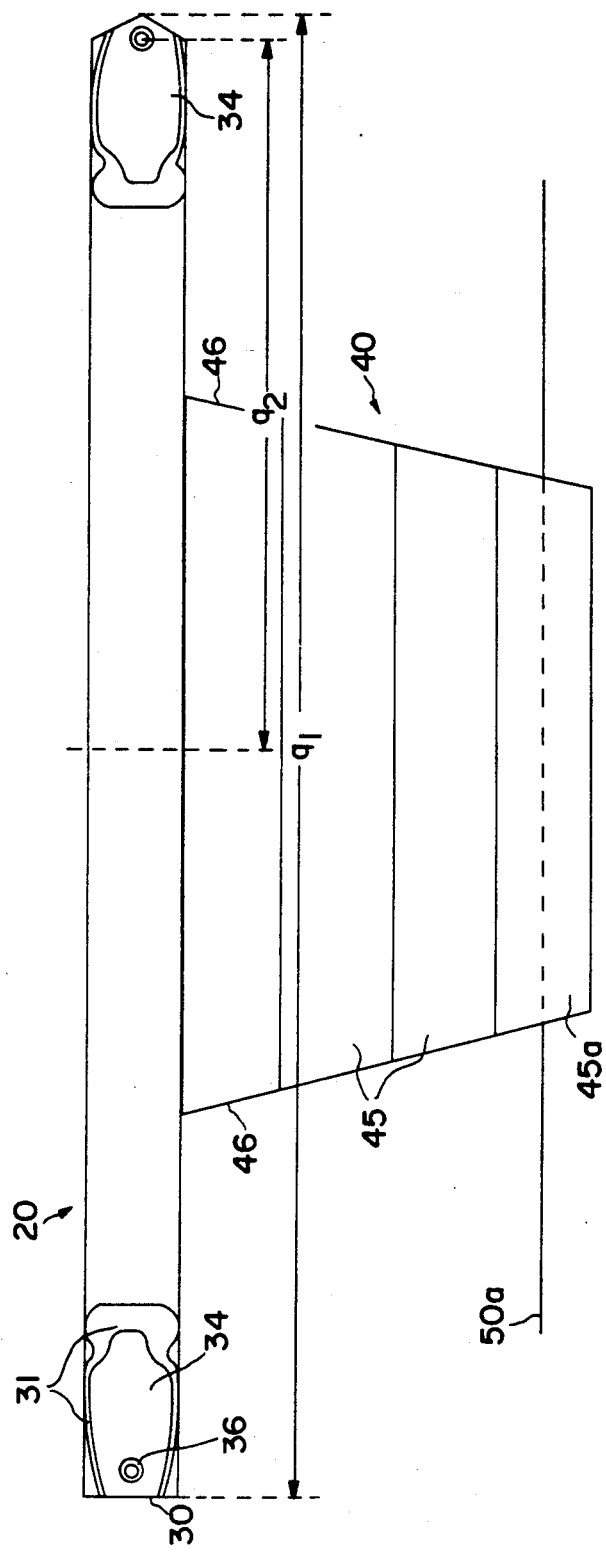

IMPACT GIRDER FOR VEHICLE DOORS

BACKGROUND OF THE INVENTION

Description

The invention concerns an impact girder for vehicle doors, in particular for the doors of passenger cars, which is extruded from a light metal alloy and, extending in the vehicle door approximately in the direction of travel can be fixed at both ends in such a way that one profile wall of the impact girder faces towards the vehicle internal space as the inner flange and a second profile wall of the impact girder provided at a distance from the first forms an outer flange.

Such impact girders are known from DE-A-36 06 024 and are provided in the vehicle doors to protect the vehicle occupants against collision deformation forces acting transverse to the direction of travel, i.e. sideways. Although these impact girders can offer better shape stiffness against torsion during impact deformation compared with those of I-shaped cross-section of EP-A-0 063 325, they can however fracture occasionally in the case of very, large acceptance force.

In accordance with DE-A-37 09 489, impact girders are to be further improved in such a way that while having a low weight, they exhibit a large measure of shape retention with a sufficient capability to compensate for the deformation energy occurring and to take up, in the case of an impact, a controllable shape with the inner flange undamaged. For this purpose, the outer flange of the impact girder is provided, approximately in the middle of its length, with a pair of formed recesses at the edge. These relief notches act against the bending of the impact girder in the case of a side impact, which tends to fracture in the final phase of deformation in the case of very high elastic limit relationships.

The installation height of an impact girder in a vehicle door is generally above the bumper height of passenger cars. This has the result that in the case of a side impact, the door box below the impact girder is forced in without substantial energy absorption and that, in consequence, practically the whole of the deformation energy has to be accepted by the impact girder.

SUMMARY OF THE INVENTION

In view of this state of the art, the inventor has taken as his objective further development of impact girders of the type discussed above in such a way that they offer improved impact protection and can be installed in a vehicle door without substantial extra outlay.

The fact is that a hollow chamber profile extruded from a light metal alloy with at least two profile chambers fastened to the impact girder leads, in the invention, to the solution of the object, the hollow chamber profile protruding in the door box below the impact girder and the profile chambers extending parallel to the latter. An additional impact protection is provided by this hollow chamber profile. Due to the stiffness of the profile chambers, the hollow chamber profile can accept energy even at the first impact of a bumper so that overall, lower acceleration forces directed towards the inside of the vehicle occur. The hollow chamber profile is preferably fixed to the impact girder in such a way that it can be released.

A particularly effective impact protection is obtained if the profile chamber furthest away from the impact girder is located, when the vehicle door is closed, partially below the uppermost, substantially horizontal surface of a door sill and at a distance from a first, substantially vertical surface of the door sill. The door sill acts, in consequence, as a further abutment for the hollow chamber profile in the case of a side impact so that additional impact protection is achieved.

The hollow chamber profile is generally located on the impact girder symmetrically about the longitudinal center of the latter and extends over approximately half of its length; it can, however, have the complete length of the impact girder.

For reasons of simpler installation in a vehicle door, the ends of the hollow chamber profile are preferably chamfered so as to taper towards the bottom.

In accordance with a further feature of the invention, the hollow chamber profile is hooked, over the whole of its length, at least into the inner flange of the impact profile. This has the result that in the case of a side impact, it is now almost impossible for the impact girder to twist into the position of minimum resistance torque. By this means, the use of the hollow chamber profile according to the invention also permits, in particular, the use of I-profile impact girders.

BRIEF DESCRIPTION OF THE DRAWINGS

Further advantages, features and details of the invention are given by the following description of preferred embodiment examples and by using the drawings. In this FIG. 1 shows the front view of a vehicle door with an impact girder provided within it;

FIG. 2 shows the partial cross-section through FIG. 1 along its line II—II;

FIG. 3 shows a side view of the impact profile;

FIG. 4 shows the plan view onto FIG. 3;

DETAILED DESCRIPTION OF THE PREFERRED EMBODIMENTS

Figure 5:
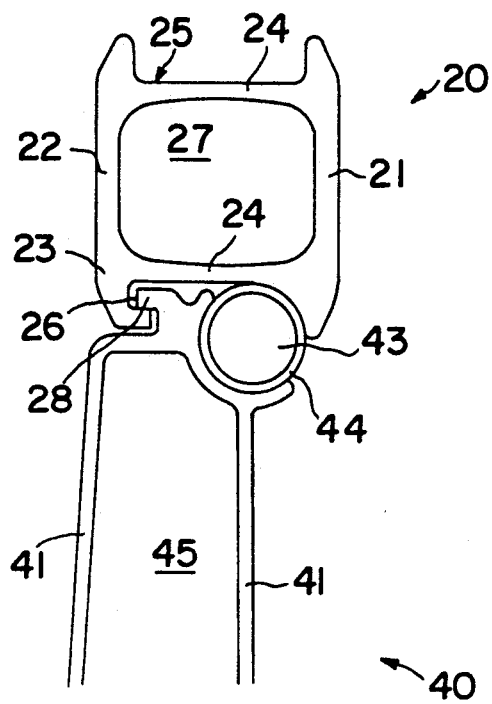
FIGS. 5, 6 show the cross-section through further embodiments of the connection between the impact girder and the hollow chamber profile.

In a vehicle door 10 for a passenger car, not reproduced for reasons of clarity, an extruded aluminum profile extends within a closed door box 11 as the impact girder 20. Its distance i from the upper edge 14 of the door box 11 is greater than the lowering depth of a window pane 13 recognizable in a frame 12. A hollow chamber profile 40 chamfered at both ends so as to taper towards the bottom protrudes from the impact girder 20 and is fastened to the latter in such a way that it can be released.

The impact girder 20 has, as shown in FIG. 2 in cross-section, two parallel walls at a distance from one another which, in the installation position of the impact girder 20, form an inner flange 22 directed towards the inside of the vehicle and an outer flange 21 adjacent to the outer surface of the door. The latter flange, with the inner flange, is supplemented by two narrow transverse walls 24 to form a hollow profile with profile chamber 27.

Both the inner flange 22 and the outer flange 21 protrude on both sides beyond the outer surfaces 25 of the transverse walls 24 and, by this means, form bead sections 23. Grooves 26 extending along the impact girder 20 are formed on the insides of the lower bead sections 23 and strips 28 protruding from the profile walls 41 of the hollow chamber profile 40 engage in these grooves. The insides of the profile walls 41, together with the transverse wall 24, form an accommodation space 43 for a spreading element 44 in the region of the impact girder 20. The hollow chamber profile 40 has a plurality of profile chambers 45 which are formed by the profile walls 41 and the transverse webs 42 connecting them. The profile chamber 45a which is most remote from the impact girder 20 is located, when the vehicle door 10 is closed, partially below the uppermost, substantially horizontal surface 50a of a door sill 50 and at a distance from a first, substantially vertical surface 50b of the door sill. Protruding approximately vertically downwards from the bottom wall 47 of the lowest profile chamber 45a, there is a profile strip 48 which, when the vehicle door 10 is closed, is located at a distance from and opposite to a second, substantially vertical surface 50d of the door sill 50. The profile strip 48 can replace, during a side impact, a crash hook normally connected to the sheet metal of the door or support said hook in its restraint function.

The impact girder 20 chamfered at both ends in a plane E has a total length q1. Each plane E encloses, with the inside of the girder of the inner flange 22, an acute angle t. Because of this obliquely laid cut, an end 30 appears which is offset from the plane F, upwards from the original contour of the inside of the girder, by an offset dimension v. In the side view of FIG. 3, the oblique surface 31 arising (due to the cutting procedure described) in the plans E may be recognized; it is composed of the cut surfaces of the transverse walls 24 and of the inner flange 22 and is of U-shaped configuration. The hollow chamber profile 40, whose end surfaces 46 are chamfered so as to taper towards the bottom, is located on the impact girder 20 symmetrically about its longitudinal center and extends over approximately half the length of the impact girder 20.

The force direction in the case of an impact, indicated by an arrow P in FIG. 4, makes the position, described further above, of the impact girder 20 in the door structure particularly clear. The force P meets the outer flange 21 in an assumed straight line N and the outer flange 21 tends to deform towards the car internal space. The distance between the straight line N located in the center of the profile length and the clamping position, hole 36 in the inner flange 22, is indicated in FIG. 3 by q2. The profile ends 34 arising due to the cutting plane E described and from the offsetting of the inside of the girder described in this connection are inserted in clinched flanges of the door frame (not shown) and are fastened by means of bolts passing through the holes 36.

The connection visible in FIG. 5 between the hollow chamber profile 40 and the impact girder 20 has clamping (on one side only) between the two parts by means of a longitudinal groove 26 in the bead section 23 on the inner flange 22 and a strip 28 of the hollow chamber profile 40 engaging in it. In an analogous manner to the embodiment of FIG. 2, the clamping is fixed by means of a spreading element 44.

Figure 6:
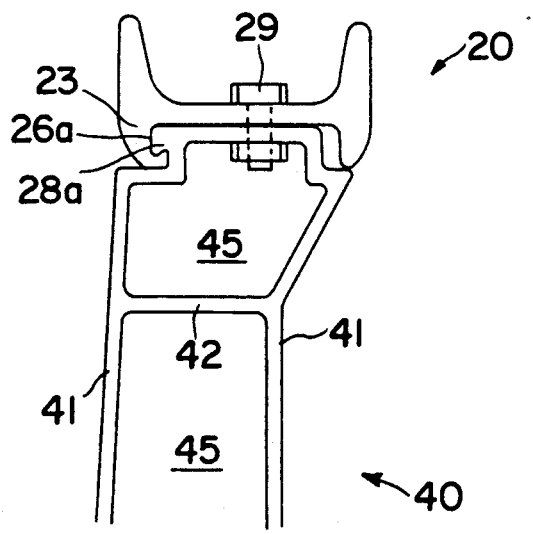

In accordance with FIG. 6, a hook-shaped groove 26a is formed in the bead section 23 on the side of the inner flange 22 and a lug strip 28a of the hollow chamber profile 40 engages in this groove 26a. The clamping is fixed by means of bolt connections 29 in the end face region of the hollow chamber profile 40. The impact profile 20 is designed as an I-profile in this case.

I claim:

1. A vehicle comprising:
   a vehicle door with a vehicle door box;
   an impact girder for said vehicle door, said girder extruded from a light metal alloy, having two ends, and first and second walls;
   said girder extending in the vehicle door box in a direction substantially parallel to a substantially horizontal axis of said vehicle door;
   means on both ends of said girder suitable for fixing both of said ends to said door so that said first wall faces towards a vehicle internal space as an inner flange and said second wall provided at a distance from the first wall forms an outer flange;
   a hollow chamber profile extruded from a light metal alloy having at least two profile chambers;
   means for fastening the hollow chamber profile on the impact girder;
   the hollow chamber profile protruding into the door box below the impact girder, wherein the profile chambers extend parallel to the impact girder;
   a first of said profile chambers being located farther away from said girder than a second of said profile chambers; and
   said first profile chamber being located when the vehicle door is closed partially below an uppermost, substantially horizontal surface of a door sill and at a distance from a first, substantially vertical surface of the door sill.

2. A vehicle according to claim 1 wherein the hollow chamber profile is fastened on the girder symmetrically about a longitudinal center of the girder and extends over approximately half the length of said girder.

3. A vehicle according to claim 1 wherein the hollow chamber profile has two ends, and wherein the ends of the hollow chamber profile are chamfered and taper inwardly towards a bottom of said hollow chamber profile.

4. A vehicle according to claim 1 wherein said fastening means comprises means for hooking the hollow chamber profile over the whole of its length, at least into the inner flange of the impact girder.

5. A vehicle according to claim 1 wherein a profile strip protrudes approximately vertically downwards from a bottom wall of the first profile chamber, said profile strip being located, when the vehicle door is closed, opposite to and at a distance from a second substantially vertical surface of the door sill.

6. A vehicle according to claim 1 wherein the fastening means comprises means for releasably fastening the hollow chamber profile on said impact girder.

* * * * *